(12) United States Patent
Yamamoto

(10) Patent No.: US 7,980,703 B2
(45) Date of Patent: Jul. 19, 2011

(54) PROJECTOR

(75) Inventor: Kyo Yamamoto, Higashimurayama (JP)

(73) Assignee: Casio Computer Co., Ltd., Tokyo (JP)

( * ) Notice: Subject to any disclaimer, the term of this patent is extended or adjusted under 35 U.S.C. 154(b) by 572 days.

(21) Appl. No.: 12/077,861

(22) Filed: Mar. 21, 2008

(65) Prior Publication Data

US 2008/0239246 A1  Oct. 2, 2008

(30) Foreign Application Priority Data

Mar. 26, 2007 (JP) ................................. 2007-078754
Jan. 18, 2008 (JP) ................................. 2008-009834

(51) Int. Cl.
*G03B 21/00* (2006.01)
*G01C 3/08* (2006.01)

(52) U.S. Cl. .................. 353/70; 356/139.03; 356/139.1; 356/154

(58) Field of Classification Search .............. 353/69, 353/70, 101; 356/3.1, 3.11, 3.12, 139.03, 356/139.1, 154
See application file for complete search history.

(56) References Cited

U.S. PATENT DOCUMENTS

| 4,636,068 | A | 1/1987 | Niiho et al. | |
|---|---|---|---|---|
| 7,123,351 | B1 * | 10/2006 | Schaefer | 356/4.07 |
| 7,204,596 | B2 * | 4/2007 | Tamura | 353/70 |
| 7,303,285 | B2 * | 12/2007 | Inoue | 353/70 |
| 7,889,324 | B2 * | 2/2011 | Yamamoto | 356/4.01 |
| 2009/0059183 | A1 * | 3/2009 | Tejima | 353/69 |
| 2009/0161091 | A1 * | 6/2009 | Yamamoto | 356/4.01 |
| 2009/0207384 | A1 * | 8/2009 | Honjo et al. | 353/69 |

FOREIGN PATENT DOCUMENTS

| JP | 58-6404 | A | 1/1983 |
|---|---|---|---|
| JP | 58-158377 | Y | 10/1983 |
| JP | 5-297140 | A | 11/1993 |
| JP | 07-084045 | A | 3/1995 |
| JP | 11-230740 | A | 8/1999 |
| JP | 2003-271941 | A | 9/2003 |
| JP | 2006-313116 | A | 11/2006 |

OTHER PUBLICATIONS

Japanese Office Action dated Jan. 8, 2009 (2 pages), and English translation thereof (3 pages) issued in counterpart Japanese Application No. 2008-009834.
Japanese Office Action dated Jun. 18, 2009 (2 pages), and English translation thereof (2 pages), issued in counterpart Japanese Application Serial No. 2008-009834.

* cited by examiner

*Primary Examiner* — William C Dowling
(74) *Attorney, Agent, or Firm* — Holtz, Holtz, Goodman & Chick, PC

(57) ABSTRACT

A projector is provided which includes a distance measuring unit which can accurately measure distances to a plurality of points on a surface of a screen using light rays. The projector of the invention has the distance measuring unit for measuring distances to the plurality of points on the surface of the screen, which includes a plurality of light ray units for irradiating light rays onto the screen and one light receiving element for receiving the light rays which are reflected on the surface of the screen, and a tilt angle calculation unit for calculating a tilt angle of the screen relative to the projector based on the distances to the plurality of points on the surface of the screen which are measured by the distance measuring unit.

12 Claims, 9 Drawing Sheets

PROJECTOR

CROSS-REFERENCE TO RELATED APPLICATION

This application is based upon and claims the benefit of priority from the prior Japanese Patent Application Nos. 2007-078754 filed on Mar. 26, 2007 and 2008-009834 filed on Jan. 18, 2008, the entire contents of which are incorporated herein by reference.

BACKGROUND OF THE INVENTION

1. Field of the Invention

The present invention relates to a projector.

2. Description of the Related Art

In these days, data projectors are used in many cases which projects an image displayed on the screen of a personal computer, an image carried on a video signal, and furthermore, an image carried on image data stored in a memory card or the like.

Many of the data projectors have a construction in which light emitted from a compact high-intensity light source, for which a metal halide lamp or extra-high pressure mercury vapor lamp is used, is converted into light beams of three primary colors by a color filter so as to be irradiated onto a display device such as a liquid crystal display device or a DMD (digital micromirror device) by a light source side optical system, and a image light beam that has passed through or been reflected by the display device is projected onto a screen via units or groups of lenses which constitute a projection side optical system having a zooming function.

In the projectors like this, there may occur a case where a keystone distortion in a projected image by a distance to the screen, a tilt angle of the screen and a projection angle, and in order to correct the keystone distortion (keystoning correction), a distance to the screen, a tilt angle of the screen and a projection angle need to be measured accurately. To make this possible, a distance measuring device needs to be provide on the projector.

SUMMARY OF THE INVENTION

The invention has been made in view of the situations described above and an objective thereof is to provide a projector having a distance measuring unit for measuring distances to a plurality of points on the surface of a screen accurately using rays of light.

According to a preferred embodiment of the invention, there is provided a projector with a distance measuring unit for measuring distances to a plurality of points on the surface of the screen, which includes a plurality of light ray units for irradiating light rays onto a screen and a light receiving element for receiving light rays reflected on a surface of the screen, and a tilt angle calculation unit for calculating a tilt angle of the screen relative to the projector based on the distances to the plurality of points on the surface of the screen which is measured by the distance measuring unit.

DESCRIPTION OF THE PREFERRED EMBODIMENTS

Figure 1:
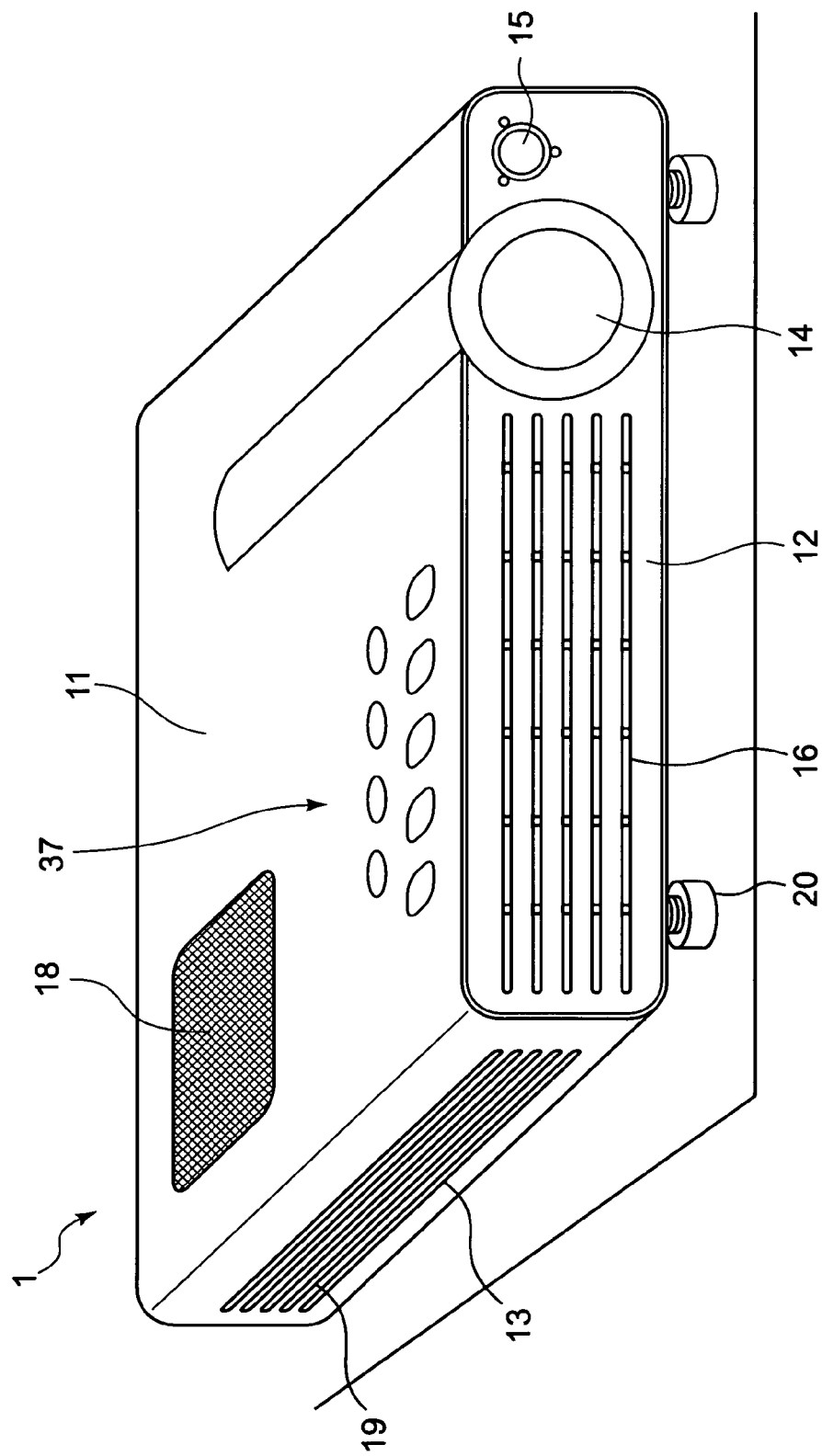
FIG. 1 is a perspective view showing an external appearance of a projector according to an embodiment of the invention.

According to a best mode for carrying out the invention, there is provided a projector 1 which includes a light source unit, a light source side optical system for guiding light from the light source unit to a display device 50, a display device 50, and a projection side optical system for projecting an image projected from the display device 50 onto a screen, having a projector control unit for controlling the light source unit and the display device 50.

In addition, the projector control unit includes a distance measuring unit for measuring distances to three points on a surface of a screen 61, as well as an average distance to the screen 61, a tilt angle calculation unit for calculating a tilt angle of the screen 61 relative to the projector 1 based on the distances to the plurality of points on the surface of the screen 61, and a distortion correcting unit for creating image data for a projected image of which distortion is corrected based on the information measured by the distance measuring unit and the information calculated by the tilt angle calculation unit.

A distance measuring unit 15, which functions as the distance measuring unit, includes three laser units 53 which irradiate leaser beams onto the screen 61 and one light receiving element 54 for receiving laser beams which have been reflected at the three points on the surface of the screen 61 and further includes a distance measuring substrate 51 to which an operation unit 63 for calculating a distance to the screen 61 from the reflected lights received by the light receiving element 54, a laser unit control unit 64 for time-sharing controlling the laser units 53, and the light receiving element 54 are fixed.

In addition, this distance measuring unit 15 includes a light receiving mirror barrel 52 which is made up of a cylindrical body which is formed into a frustum of circular cone and is made open in both end faces thereof and which is disposed on a circumferential edge of the light receiving element 54 for removing unnecessary light with the light receiving element 54 positioned in a central portion on a narrow open end thereof and a condenser lens 55 which is disposed in such a manner as to close a wide open end of the light receiving mirror barrel 52 and is adapted to gather as much of light reflected from the screen 61 as possible so as to direct it to the light receiving element 54, and the three laser units 53 are disposed radially on an exterior surface of the light receiving mirror barrel 52 at intervals of an equal internal angle.

Furthermore, the distance measuring unit 15 also includes a reflection mirror 56 which is disposed in an interior of the light receiving mirror barrel 52 for reflecting towards the light receiving element 54 part of light which is incident on the light receiving mirror barrel 52 and which intersects a common optical axis of the light receiving mirror barrel 52, the light receiving element 54 and the condenser lens 55 at a large angle, and this reflection mirror 56 is provided in the same number as the number of laser units 53, that is, three so as to function as a light quantity adjusting unit. In addition, these three reflection mirrors 56 are made to pair up with the three laser units 53, respectively, to make a predetermined pair and are disposed so that part of light that is emitted from the paired laser unit 53, is then reflected on the surface of the screen 61 and is incident on the light receiving mirror barrel 52 is reflected thereby in the direction of the light receiving element 54.

Hereinafter, an embodiment of the invention will be described based on the drawings. As is shown in FIG. 1, the projector 1 according to the embodiment of the invention includes a projection opening 14 and a distance measuring unit 15 which are provided in the vicinity of an end of a front plate 12 of a main body case, and a plurality of exhaust ports 16 from which air that has cooled or absorbed heat inside the case of the projector 1 is expelled are formed in such a manner as to extend from the vicinity of the projection opening 14 to the vicinity of the other end of the front plate 12, and furthermore, although not shown, an Ir receiving unit is provided for receiving a control signal from a remote controller.

In addition, the projector 1 includes a key/indicator unit 37 and an audio output unit 18 which are provided on an upper plate 11 of the main body case, and included in this key/indicator unit 37 are keys and indicators such as a power supply switch key, a power indicator lamp which indicates whether a power supply is switched on or off, a lamp switch key which turns on a lamp of the light source unit, a lamp indicator which indicates whether the lamp is illuminated or not, and an overheat indicator which indicates that the light source unit overheats when it really occurs.

Furthermore, although not shown, on a back plate which constitutes a back side of the main body case of the projector 1 has an input/output connector unit where USB terminal, image signal inputting D-SUB terminal, S terminal, RCA terminal and the like are provided, as well as various types of terminals including a power supply adaptor plug and a memory card slot.

In addition, the projector 1 includes a plurality of intake ports 19 which are provided on each of a right-hand side plate 13, which is a side plate of the main body case, and a left-hand side plate, and has front legs 20 which is adapted to extend and contract on a bottom plate, which constitutes a bottom side of the main body case, for adjusting a projection angle so as to project an image onto a screen with the projector 1 oriented upwards.

Additionally, the projector 1 has a power supply control circuit board which includes a lamp power supply circuit block or the like and a main circuit block which includes a project control unit in an interior thereof, and also includes a cooling fan for reducing the interior temperature of the projector 1, a high-intensity light source unit including a halogen lamp which functions as a light source unit, a DMD (digital micromirror device) which functions as a display device for creating an image, a light source side optical system for gather as much of light from the light source unit as possible to direct it to the DMD, and a projection side optical system for projecting reflected light from the DMD onto a screen.

This DMD has a number of micromirrors which are arranged into a matrix and is adapted to reflect incident light which is incident from an incident direction which is tilted in one direction relative to a front direction in such a manner as to divide it into on-state light rays directed in the front direction and off-state light rays directed in an oblique direction by switching the tilt directions of the micromirrors so arranged so as to form an image. In other words, light incident on the micromirrors which are tilted in one tilt direction is reflected by the micromirrors in the front or "on" direction so as to be converted into on-state light rays, and light incident on the micromirrors which are tilted in the other tilt direction is reflected in the oblique or "off" direction by the micromirrors so as to be converted into off-state light rays, with the off-state light rays made to be absorbed by a light absorbing plate, so that the light rays reflected in the front direction effect bright indications while the light rays reflected in the oblique direction dark indications so as to form an image.

Figure 2:
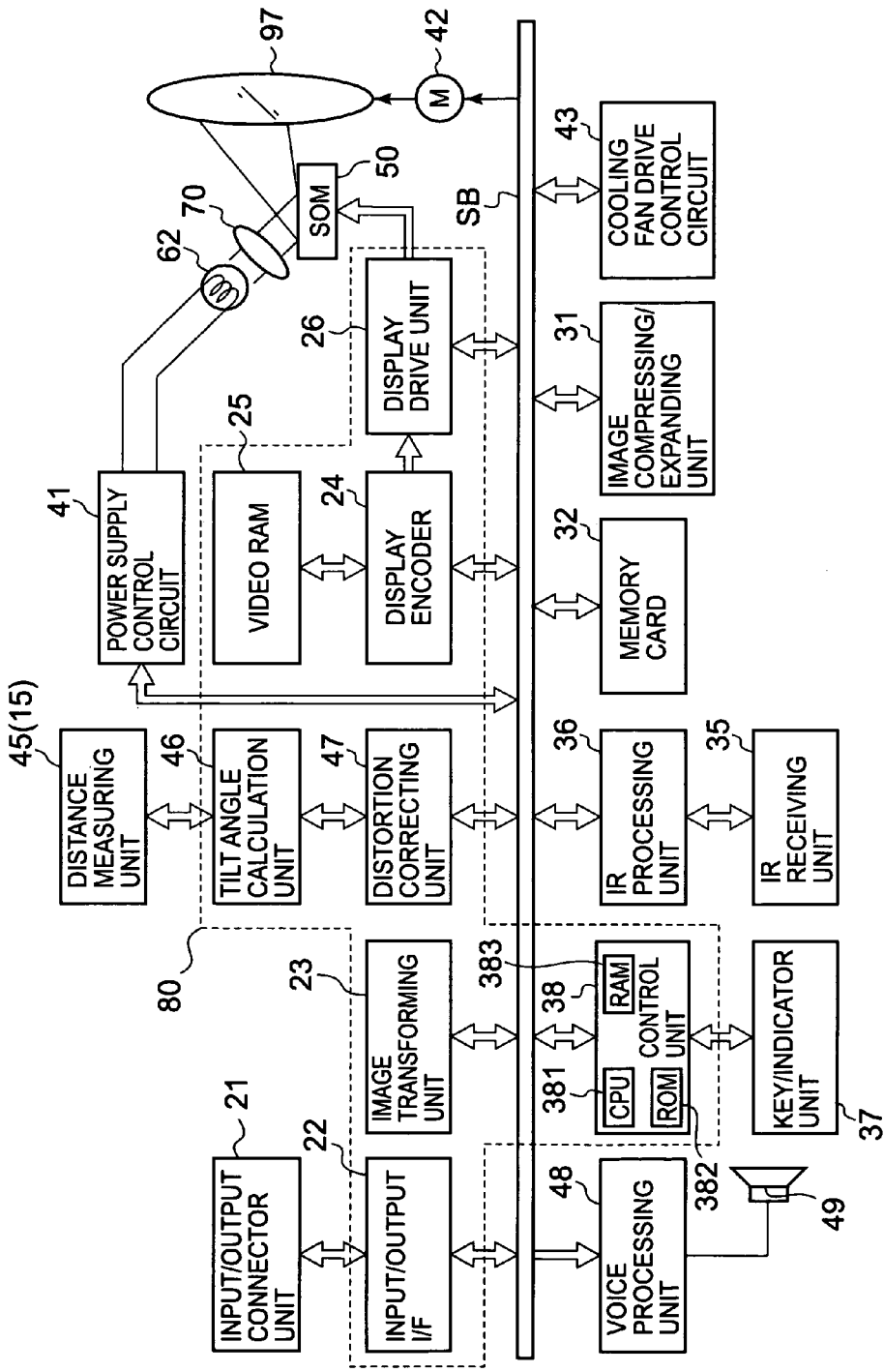
FIG. 2 is a functional circuit block diagram of the projector according to the embodiment of the invention.

As is shown in FIG. 2, the projector control unit 80 of this projector 1 is such as to have a control unit 38, an input/output interface 22, an image transforming unit 23, a display encoder 24, a video RAM 25, a display drive unit 26, a tilt angle calculation unit 46, and a distortion correcting unit 47, and image signals of various standards which are inputted from an input/output connector unit 21 are sent to the image transforming unit 23 via the input/output interface 22 and a system bus (SB) so as to be converted to be unified into an image signal of a predetermined format which is suitable for display, whereafter the image signal is sent to the display encoder 24.

The display encoder 24 deploys the image signal sent thereto on the video RAM 25 for storage and creates a video signal from the contents stored in the video RAM 25 for output to the display drive unit 26.

The display drive unit 26, into which the video signal is inputted from the display encoder 24, is such as to drive a display device 50, which is a spatial optical modulator (SOM), at an appropriate frame rate in association with the image signal sent thereto, whereby by causing light from a light source unit 62 to be incident on the display device 50 via a light source side optical system 70, a light image is formed by reflected light from the display device 50, and the image so formed is then projected onto a screen, not shown, via the projection side optical system for display on the screen. In addition, a movable lens group 97 of the projection side optical system is such as to be driven by a lens motor 42 for zooming or focusing a projection lens.

An image compressing/expanding unit 31 enables a recording operation in which a luminance signal and a color difference signal of the image signal are data compressed through an operation such as ADTC and Huffman coding so as to be written sequentially on a memory card 32 which is a detachable recording medium and in a reproduction mode a display operation in which image data recorded on the memory card 32 is read out, and individual image data which make up a series of moving pictures are expanded one frame by one frame to send the data so expanded to the display encoder 24 via the image transforming unit 23, so that the moving pictures are displayed based on the image data stored on the memory card 32.

A distance measuring unit 45 is such as to measure distances to a plurality of points on the surface of the screen using a laser beam, which is one of light rays, so as to calculate an average distance to the screen, and the tilt angle calculation unit 46 is such as to calculate a tilt angle of the screen based on the distances to the plurality of points on the surface of the screen which were measured by the distance measuring unit 45. In addition, the distance measuring unit 45 and the tilt angle calculation unit 46 transmit data measured or calculated to the distortion correcting unit 47. In addition, the average distance to the screen which is calculated by the distance measuring unit 45 is such as to be used for focusing by the lens motor 42.

The distortion correcting unit 47 is such as to correct the distortion of a projected image based on the data received from the distance measuring unit 45 and the tilt angle calculation unit 46, transmit the image signal after the correction of distortion to the display encoder 24 via the image transforming unit 23 and display the projected image of which distortion has been corrected.

The control unit 38 is such as to govern the control of operations of circuits within the projector 1 and is made up of a CPU 381, a ROM 382 in which operation programs such as various types of settings are stored in a fixed fashion and a RAM 383 which is used as a working memory.

Control signals of the key/indicator unit 37, which is made up of main keys and indicators which provided on the upper plate 11 of the main body case are sent out directly to the control unit 38, key control signals from the remote controller are received at the Ir receiving unit 35, and code signals which are demodulated by an Ir processing unit 36 are sent to the control unit 38.

In addition, a voice processing unit 48 is connected to the control unit 38 via a system bus (SB), and the voice processing unit 48 includes a sound source circuit such as a PCM sound source, whereby in a projection mode and a reproduction mode the voice processing unit 48 is adapted to convert voice data into analog signals and drive a speaker 49 to emit sound loudly.

The control unit 38 controls a power supply control circuit 41, and this power supply control circuit 41 illuminates a discharge lamp of the light source unit when the lamp switch key is operated. Furthermore, the control unit 38 controls a cooling fan drive control circuit 43, and this cooling fan drive control circuit 43 controls the rotation speed of the cooling fan based on temperatures detected by a plurality of temperature sensors provided on the light source unit or the like and keeps the cooling fan to rotate continuously by a timer even after the lamp of the lamp source unit has been switched off. In addition, the control unit 38 stops the light source unit depending upon the results of temperature detections by the temperature sensors and then switches off the power supply of the projector main body.

Next, the distance measuring unit 15 will be described which is disposed on the front plate 12 of the projector 1 for measuring distances to the screen by making use of laser beams. A general laser distance meter is such as to project a laser beam while switching it on and off at a predetermined frequency so as to calculate a distance from a difference in phase of the laser beam between when it is emitted and when received. However, since a tilt angle of the screen needs to be calculated in order for the distance measuring unit 15 to be used to correct the distortion of the projector 1, an accurate correction cannot be attained only by measuring a distance to one point on the surface of the screen, and hence, distances to at least three different points on the surface of the screen need to be measured to measure a tilt angle of the screen. In addition, in the event that the three different points lie in a straight line, a tilt angle in only one direction, that is, in a horizontal direction or a vertical direction can be measured, and therefore, in order to obtain a tilt angle of a flat surface, distances to three points which do not lie in a straight line need to be measured.

Figure 3:
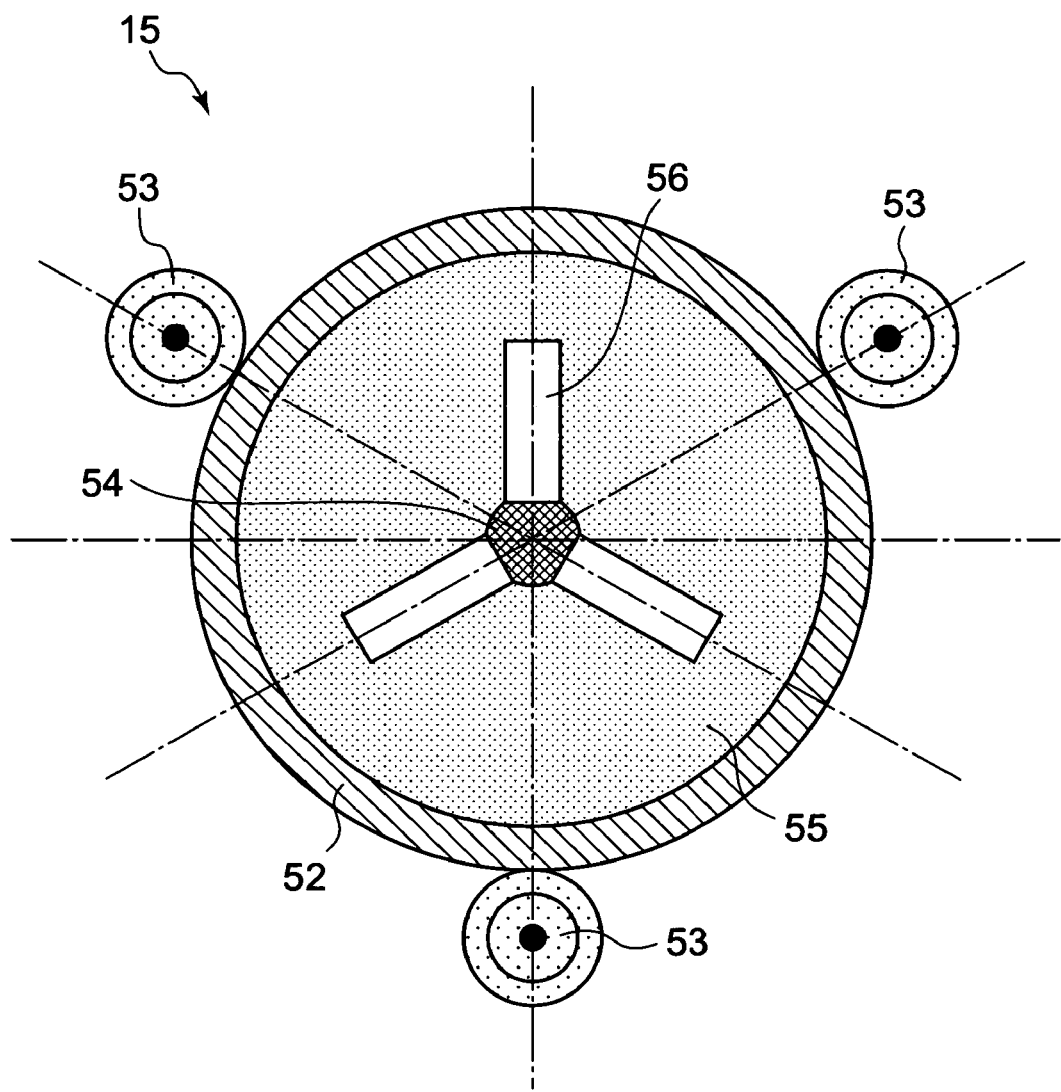
FIG. 3 is a top view of a distance measuring unit according to the embodiment of the invention.
Figure 4:
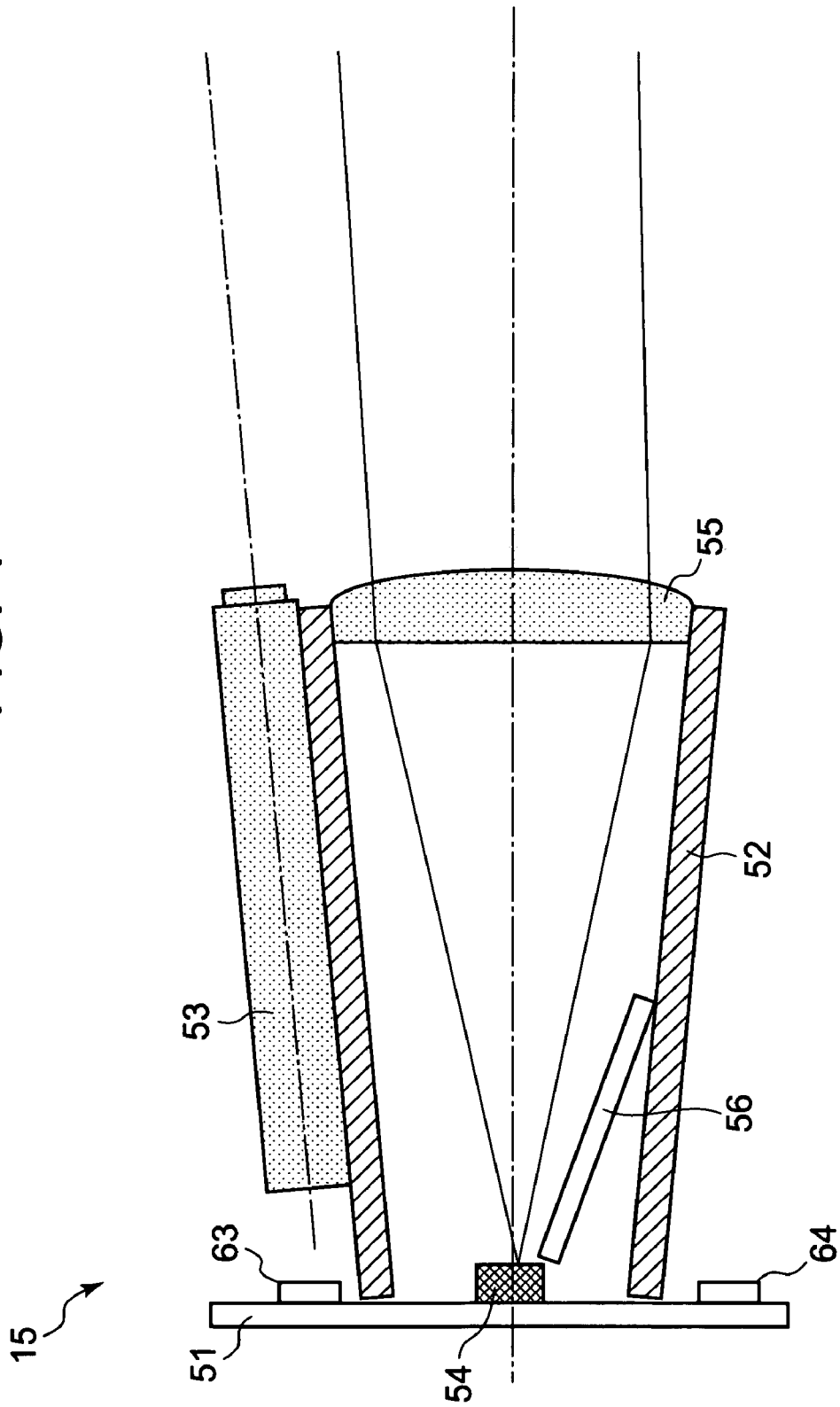
FIG. 4 is a sectional view of the distance measuring unit according to the embodiment of the invention.

The distance measuring unit 15 of the embodiment is made up of the distance measuring unit 45, and as is shown in FIGS. 3 and 4, the distance measuring unit 45 includes a distance measuring substrate 51, a light receiving element 54 fixed to the distance measuring substrate 51, a light receiving mirror barrel 52 which is made up of a cylindrical body which is formed into a frustum of circular cone and is made open in both end faces thereof and which is disposed on a circumferential edge of the light receiving element 54, three laser units 53 (light ray units) which are disposed radially in three directions on an exterior surface of the light receiving mirror barrel 52 for emitting laser beams, a condenser lens 55 which is disposed at a distal end portion of the light receiving mirror barrel 52 and three reflection mirrors 56 which are disposed radially in an interior of the light receiving mirror barrel 52 to function as light quantity adjusting units.

The distance measuring substrate 51 has an operation unit 63 for calculating distances to a plurality of points on the surface of the screen and an average distance from reflected light received by the light receiving element 54 and a laser units control unit 64 (a light ray units control unit) for time-sharing control the laser units 53, and the light receiving element 54 is fixed to this distance measuring substrate 51.

The light receiving element 54 is a highly sensitive light receiving element such as an avalanche photodiode for amplifying an optical signal by making use of avalanche multiplication phenomenon which is caused by an electron avalanche phenomenon and is such as to be used as a light receiving element in a commercially available laser distance meter, and the light receiving element 54 receives laser beams which are emitted from the laser units 53 and are then reflected on the surface of the screen to convert them into electric information and transmits the electric information so converted to the operation unit 63 possessed by the distance measuring substrate 51.

The light receiving mirror barrel 52 is the cylindrical body formed into a frustum of circular cone, the frustum of circular cone being opened in an upper surface and a bottom surface thereof and is disposed to prevent unnecessary external light from being incident on the light receiving element 54. The light receiving element 54 is disposed in a central portion of an end portion at a narrow open end, and the condenser lens 55 is disposed in such a manner as to close an end portion at a wide open end of the light receiving mirror barrel 52. The light receiving mirror barrel 52 is disposed vertical relative to the distance measuring substrate 51.

Figure 5:
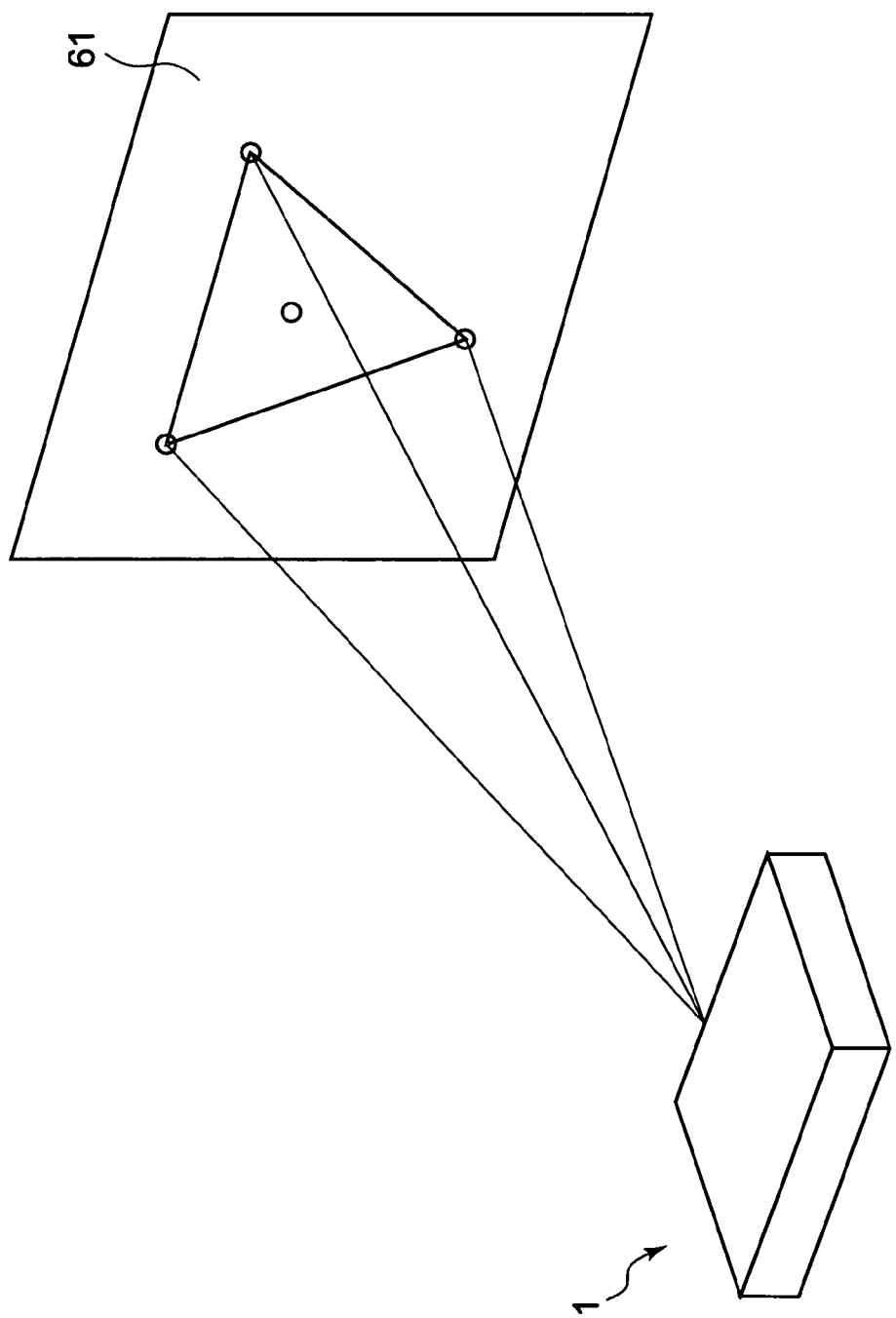
FIG. 5 is a schematic perspective view showing a state in which laser beams are emitted onto a screen by the distance measuring unit according to the embodiment of the invention.

The laser units 53 each include a laser light source for emitting a laser beam, which is a straight line beam, in an interior thereof and are time-sharing controlled by the laser units control unit 64 on the distance measuring substrate 51. Two laser units 53 and one laser unit 53 are disposed radially in upper positions and a lower position radially, respectively, on the exterior surface of the light receiving mirror barrel 52 at intervals of an equal internal angle. Since the laser units 53 are disposed radially on the exterior surface of the light receiving mirror barrel 52 at such intervals of an equal internal angle, the laser units 53 can emit laser beams towards different apexes of an arbitrary triangle on the surface of the screen 61 as is shown in FIG. 5.

The condenser lens 55 is a lens which is disposed in such a manner as to close the end portion at the wide open end of the light receiving mirror barrel 52 to gather as much of light from the surface of the screen 61 as possible so as to direct it towards the light receiving element 54. Namely, the condenser lens 55 refracts light emitted from the laser units 53 and reflected on the surface of the screen 61 in such a manner as to be incident on the light receiving mirror barrel 52 so as to gather as much of the light as possible to direct it towards the light receiving element 54 so as to be incident thereon.

The three reflection mirrors 56, which function as the light quantity adjusting units, are made to pair up with the three laser units 53, respectively and are controlled to be tilted to allow part of light emitted by the mating laser units 53 and reflected on the screen 61 to be incident on the light receiving element 54. The reflection mirrors 56 are fixed to an interior surface of the light receiving mirror barrel 52 in positions which are symmetrical with the laser units 53 relative to the center of the light receiving mirror barrel 52.

In the distance measuring unit 15 that is configured as has been described heretofore, when comparing the intensity of reflection light with a projection distance of 5 m and the intensity of reflection light with a projection distance of 0.5 m, since the intensity of light is in inverse proportion to square of distance, in theory, the intensity of the latter should be something like 100 times that of the former. However, in case the intensity of the latter reflected light becomes 100 times that of the former reflected light in reality, in almost all light receiving elements, the light intensity surpasses a dynamic range which is a ratio of a least light intensity to a greatest light intensity.

Then, in this embodiment, to cope with this problem, in the distance measuring unit 15, the condenser lens 55 is adjusted such that reflected light reflected on the surface of a screen 61 which lies a long distance therefrom is incident on the center of the light receiving element 54 while reflected light reflected on the surface of a screen 61 which lies a short distance therefrom is irradiated onto the reflection mirrors 56, and furthermore, the reflection mirrors 56 are adjusted such that part of the reflected light which is made to be incident on the reflection mirrors 56 is allowed to be incident on the light receiving element 54 while bundles of rays of the remaining reflected light are prevented from being incident on the light receiving element 54, whereby the intensity of the reflected light reflected from the short distance is made to stay on the order 10 times the intensity of the reflected light reflected from the long distance. Thus, measuring various distances is enabled by adjusting the reflection mirrors 56 in the way described above.

Next, the function and operation of the distance measuring unit 15 will be described which is configured as has been described above. In the case of the screen 61 being positioned in a long distance from the projector 1, laser beams emitted from the laser units 53 and reflected on the surface of the screen 61 are, as shown in FIG. 4, irradiated onto the condenser lens 55, and then are refracted by the condenser lens 55 in such a manner as to be directed towards the light receiving element 54 to thereby be incident on the vicinity of the center of the light receiving element 54.

Figure 6:
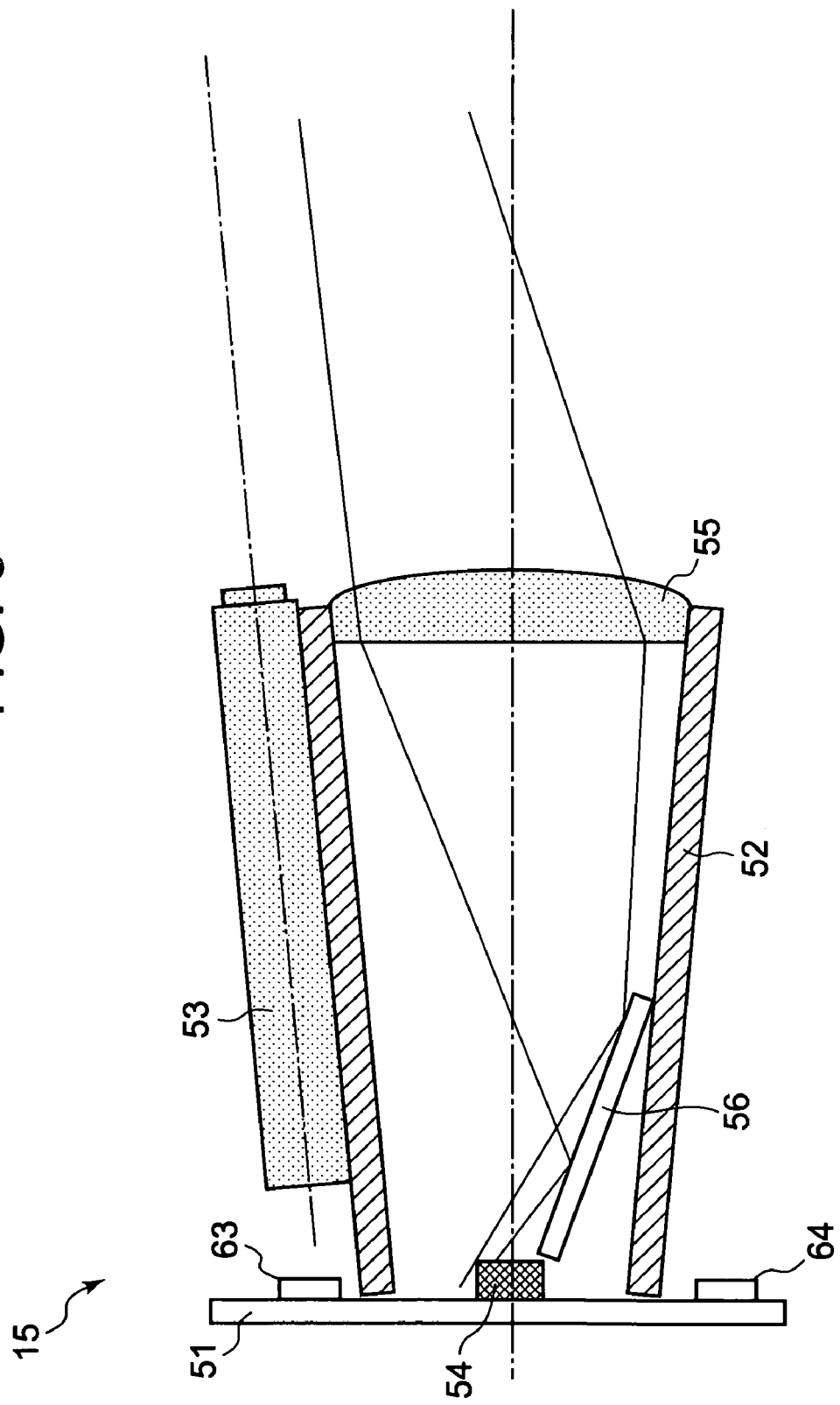
FIG. 6 is a diagram showing optical paths of reflected lights from the screen in the distance measuring unit according to the embodiment of the invention when the screen is situated near the projector.

On the other hand, in the case of the screen 61 being positioned in a short distance from the projector 1, laser beams emitted from the laser units 53 and reflected on the surface of the screen 61 are, as shown in FIG. 6, irradiated at large angles relative to the optical axis of the condenser lens 55, and are then refracted by the condenser lens 55 towards the reflection mirrors 56 to be divided into light which is to be reflected by the reflection mirrors 56 towards the light receiving element 54 and light which is not incident on the light receiving element 54, whereby part of the reflected light is allowed to be incident on the light receiving element 54.

The light receiving element 54 which has received the reflected light reflected from the screen 61 transmits electric information produced from the light so received to the operation unit 63 possessed by the distance measuring substrate 51, the operation unit 63 then calculates distances to the respective points on the surface of the screen 61 and an average distance to the screen 61 which is a distance to a center of the three points from the electric information so received, and the tilt angle calculation unit 46 calculates a tile angle of the screen 61 based on the data calculated by the operation unit 63.

Thus, by calculating the distance to and tilt angle of the screen 61 based on the distances from the three different points on the surface of the screen 61, an accurate distance to and tilt angle of the screen 61 can be obtained, whereby an accurate distortion correction can be implemented in the distortion correcting unit 47. In addition, since the average distance to the screen 61 which is the distance to the center of the three points is calculated, an image beam projected from the projection lens can be focused substantially on the center of a projected image.

According to the projector 1 of the embodiment, by including the distance measuring unit 15 which has the plurality of laser units 53 and the single light receiving element 54 which receives a bundle of laser beams which are emitted from the plurality of laser units 53 and reflected on the surface of the screen, the necessity is obviated of disposing a plurality of distance measuring units 15 to obtain distances from the different points on the surface of the screen and disposing a driving mechanism to drive the distance measuring units 15 so disposed, whereby distances to a plurality of points on the surface of the screen can easily be obtained even with a small projector.

In addition, since unnecessary light which is incident on the light receiving element 54 can be removed by disposing the light receiving mirror barrel 52 and a bundle of rays of light which is reflected on the surface of the screen 61 to thereby be incident on the light receiving mirror barrel 52 can be made to be incident on the light receiving element 54 by providing the condenser lens 55, highly accurate distance measurement can be enabled even though the quantity of laser beam emitted from the laser units 53 is small and a reduction in amount of consumed electricity can be realized.

Additionally, by forming the light receiving mirror barrel 52 into the cylindrical body having the shape of a frustum of circular cone which is opened in both the end faces with the wide open end disposed at the light incident end, and disposing the plurality of laser units 53 radially on the exterior surface of the light receiving mirror barrel 52, reflected light is allowed to be incident on the light receiving mirror barrel 52 from the end having a wide open area, and hence, the quantity of light incident on the light receiving mirror barrel 52 can be increased.

Furthermore, by disposing the reflection mirrors 56 which function as the light quantity adjusting units, part of the bundle of rays of light which is incident on the light receiving mirror barrel 52 but is not incident on the light receiving element 54 due to the light being so incident at the large angle with respect to the optical axis of the condenser lens 55 and the light receiving element 54 as when the screen 61 is placed in the short distance from the projector 1 can be made to be incident on the light receiving element 54 while the remaining part of the bundle of rays of light is not allowed to be incident on the light receiving element 54, whereby the intensity of the reflected light can be adjusted, thereby making it possible to enable accurate measurement of various distances from a short distance to a long distance. In addition, the quantity of light can be adjusted easily by making the reflection mirrors 56 to pair up with the laser units 53, respectively.

Additionally, by disposing the three laser units 53 so as to irradiate laser beams to apexes of an arbitrary triangle on the surface of the screen 61, the tilt angle of the flat surface which is the screen 61 can be measured accurately, whereby the distance to the screen 61 and the tilt angle of the screen 61 which are used in correcting distortion can be measured to obtain accurate numerical values.

In addition, since the distance measuring unit 15 includes the distance measuring substrate 51 having thereon the operation unit 63 and the laser units control unit 64, when disposing the distance measuring unit 15 on the projector 1, the necessity is obviated of separately providing a substrate for controlling the distance measuring unit 15 and hence, the distance measuring unit 15 can easily be disposed on the projector 1.

Figure 7:
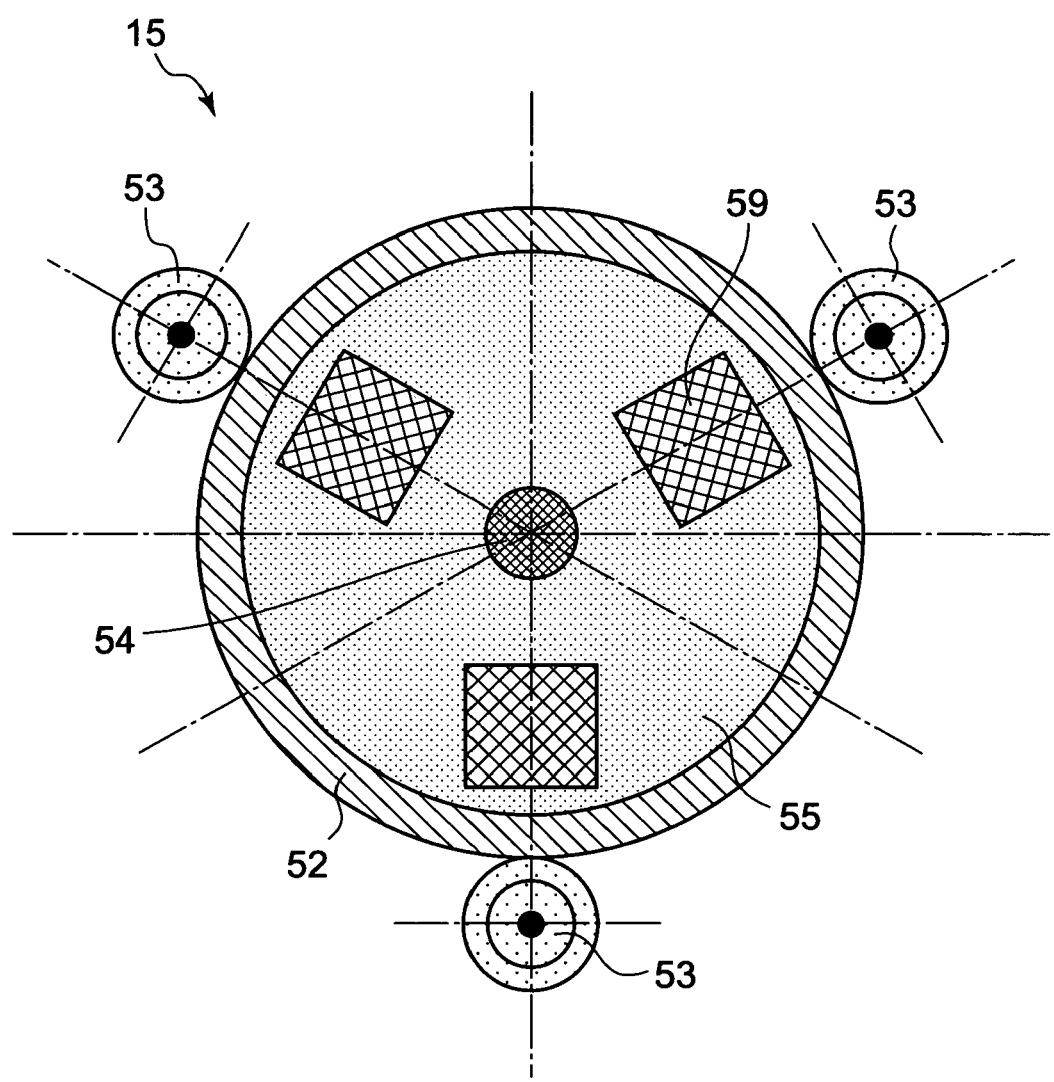
FIG. 7 is a top view of a distance measuring unit according to a modified example of the invention.
Figure 8:
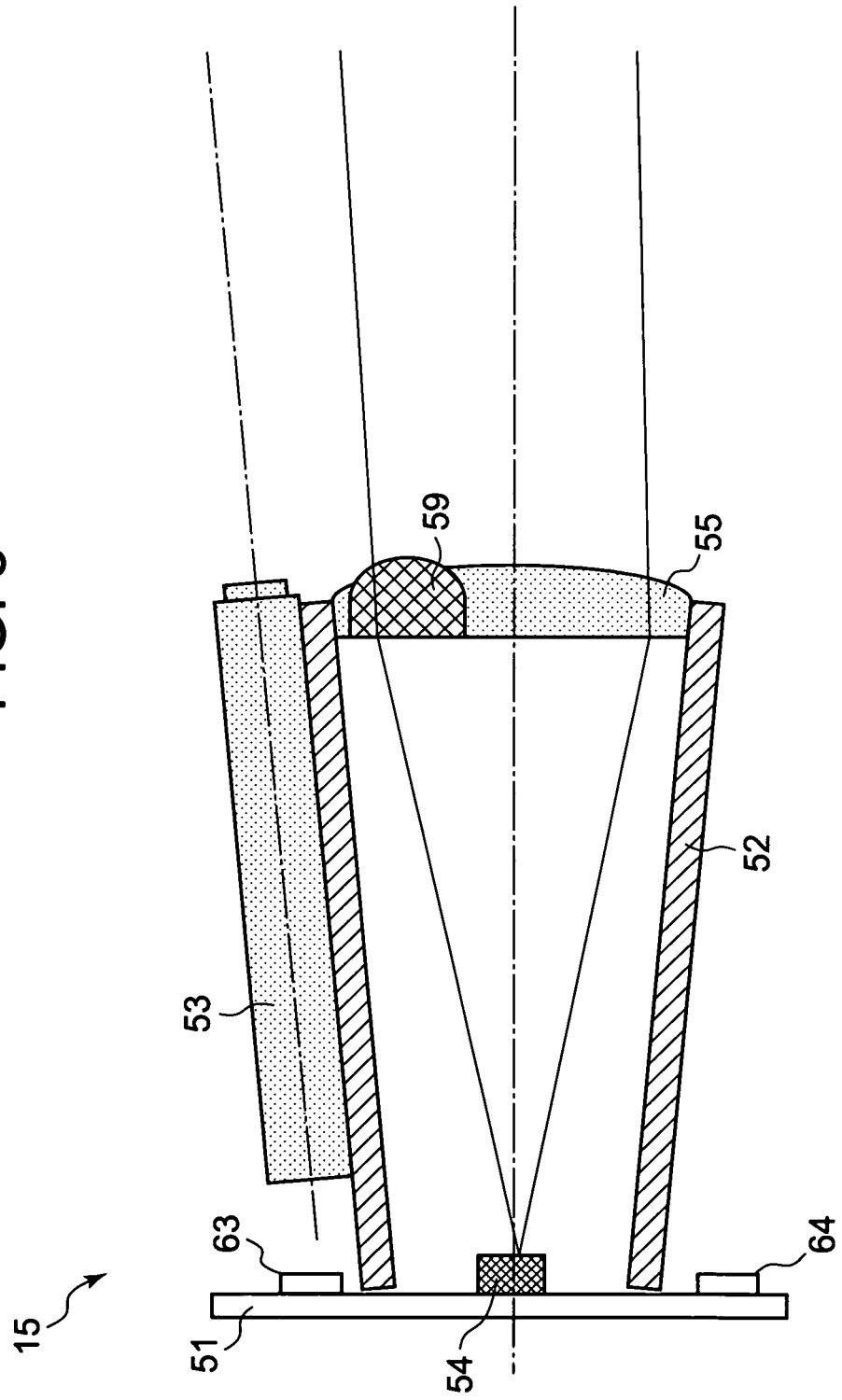
FIG. 8 is a sectional view of the distance measuring unit according to the modified example of the invention.

Next, a modified example of the invention will be described. While in the embodiment, the reflection mirrors 56 are used as the light quantity adjusting units, in a distance measuring unit 15 of this modified example, as is shown in FIGS. 7 and 8, short distance lenses 59 are incorporated in a condenser lens 55 in such a manner as to be situated on radial straight lines between laser units 53 which are provided radially on an exterior surface of a light receiving mirror barrel 52 and the center of the light receiving mirror barrel 52, and the short distance lenses 59 so provided are made to function as light quantity adjusting units.

Figure 9:
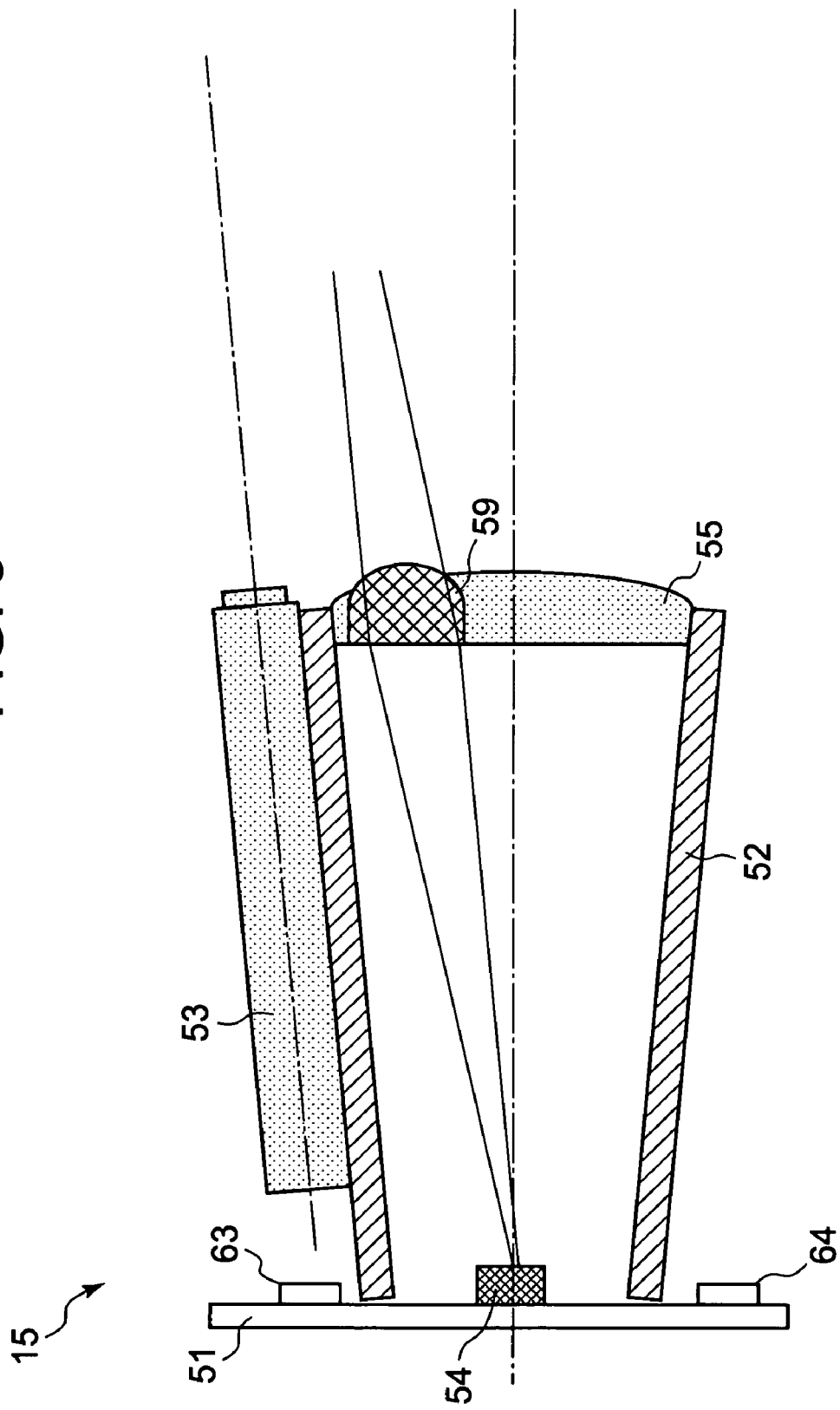
FIG. 9 is a diagram showing optical paths of reflected lights from a screen in the distance measuring unit according to the modified example of the invention when the screen is situated near the projector.

By incorporating the short distance lenses 59 in the condenser lens 55 as the light quantity adjusting units in the way described above, part of light which is reflected from the screen 61 which is placed a short distance and is incident on the light receiving mirror barrel 54 at a large angle with respect to the optical axis of the condenser lens 55 and a light receiving element 54 can be made to be incident on the light receiving element 54 via the short distance lenses 59 as is shown in FIG. 9, and almost all the reflected light which passes through the remaining portion of the condenser lens 55 where no short distance lenses 59 are incorporated is not allowed to be incident on the light receiving element 54, whereby a difference in light intensity between reflected light from the screen 61 placed in a short distance and reflected light from the screen 61 placed in a long distance can be reduced, enabling accurate measurement of various distances.

While in the embodiment, the three laser units 53 are used, the invention is not limited to this particular number, provided that three or more laser units are provided, and the more laser units are provided, the more accurate tilt angle of the screen 61 can be obtained. However, the increase in the number of laser units 53 makes the tilt angle calculation complex, which makes, in turn, the correction of distortion complex. Due to this, it is most efficient to obtain a tilt angle of the screen 61 from three different points on the flat plane.

In addition, while in the embodiment, the laser units 53 are illustrated as two of them being disposed on the upper portion of the light receiving mirror barrel 52 and the remaining one being disposed on the lower portion thereof, the invention is not limited to this particular arrangement of the laser units 53. However, since the projector 1 of the embodiment projects an image onto the screen 61 from below towards obliquely upwards, a projected image is distorted wide towards the top and narrow towards the bottom, and hence, it is appropriate in obtaining a tilt angle of the screen 61 that the two laser units are disposed on the upper portion and the one laser unit is disposed on the lower portion of the light receiving mirror barrel 52.

Additionally, while in the embodiment, the distances to the screen are measured by making use of the laser beam, which is one of light rays, the invention is not limited to the laser beam, and hence, any light ray may be adopted, provided that the light ray is such that the light ray is emitted towards an object while being modulated using a reference signal which is transmitted at a predetermined frequency so as to measure a distance to the object by detecting a difference in phase between a light receiving signal which signals the reception of light returning from the object and the reference signal. For example, a light emitting element such as an LED can be adopted, provided that light emitted can be modulated and irradiate onto an object, and light ray units made up of such light emitting elements can be used in place of the laser units 53.

In addition, the invention is not limited to the embodiment and modified example that have been described heretofore but can freely be modified or improved variously without departing from the spirit and scope of the invention.

What is claimed is:

1. A projector comprising:
    a distance measuring unit for measuring distances to a plurality of points on a surface of a screen, the distance measuring unit comprising a plurality of light ray units for irradiating light rays onto the screen and one light receiving element for receiving the light rays reflected on the surface of the screen; and
    a tilt angle calculation unit for calculating a tilt angle of the screen relative to the projector based on the distances to the plurality of points on the surface of the screen which are measured by the distance measuring unit;
    wherein the distance measuring unit further comprises:
        a light receiving mirror barrel disposed on a circumferential edge of the light receiving element for removing unnecessary light; and
        a condenser lens disposed at one end of the light receiving mirror barrel for gathering as much of the reflected light from the screen as possible so as to direct it to the light receiving element.

2. A projector as set forth in claim 1, wherein the light ray is a laser beam.

3. A projector as set forth in claim 1, wherein the light receiving mirror barrel comprises a cylindrical body which has a shape of a frustum of a circular cone and is open at both end faces thereof, the light receiving element being positioned in a central portion at a narrow open end of the cylindrical body and the condenser lens being disposed so as to close an end portion at a wide open end of the cylindrical body, and
    wherein the plurality of light ray units are disposed on an exterior surface of the light receiving mirror barrel at intervals of an equal internal angle.

4. A projector as set forth in claim 1, wherein the distance measurement unit further comprises a light quantity adjusting unit,
    wherein the light quantity adjusting unit comprises a plurality of reflection mirrors, which are disposed in an interior of the light receiving mirror barrel for reflecting, towards the light receiving element, part of light which is incident on the light receiving mirror barrel and is at a large angle with respect to an optical axis of the light receiving mirror barrel; and
    wherein a quantity of the reflection mirrors is the same as a quantity of the plurality of light ray units.

5. A projector as set forth in claim 4, wherein the reflection mirrors are respectively paired with the plurality of light ray units so as to make predetermined pairs, and are disposed such that part of light emitted from each light ray unit and reflected on the surface of the screen is reflected towards the light receiving element paired with the light ray unit.

6. A projector as set forth in claim 1, wherein the distance measurement unit further comprises a light quantity adjusting unit, wherein the light quantity adjusting unit comprises a plurality of short distance lenses;

wherein a quantity of the short distance lenses is the same as a quantity of the plurality of light ray units; and wherein the short distance lenses are incorporated in the condenser lens at respective positions on straight lines which connect the plurality of light ray units with a center of the light receiving mirror barrel, and the short distance lenses refract, towards the light receiving element, part of light which is incident on the light receiving mirror barrel and is at a large angle with respect to an optical axis of the condenser lens.

7. A projector as set forth in claim 1, wherein three of the light ray units are provided, and the distance measuring unit emits light from the three light ray units towards different apexes of an arbitrary triangle on the surface of the screen so as to calculate distances to the three points on the surface of the screen and an average distance to a position on the screen which lies in a center of the three points from reflected light from the three points.

8. A projector as set forth in claim 2, wherein three of the light ray units are provided, and the distance measuring unit emits light from the three light ray units towards different apexes of an arbitrary triangle on the surface of the screen so as to calculate distances to the three points on the surface of the screen and an average distance to a position on the screen which lies in a center of the three points from reflected light from the three points.

9. A projector as set forth in claim 1, wherein the distance measuring unit comprises a distance measuring substrate which comprises an operation unit for calculating a distance to the screen from reflected light received by the light receiving element, a light ray units control unit for time-sharing controlling the light ray units, and the light receiving element.

10. A projector as set forth in claim 2, wherein the distance measuring unit comprises a distance measuring substrate which comprises an operation unit for calculating a distance to the screen from reflected light received by the light receiving element, a light ray units control unit for time-sharing controlling the light ray units, and the light receiving element.

11. A projector as set forth in claim 1, further comprising:
a light source unit;
a display device;
a light source side optical system for guiding light from the light source unit to the display device;
a projection side optical system for projecting an image projected from the display device onto the screen; and
a projector control unit for controlling the light source unit and the display device;
wherein the projector control unit comprises the distance measuring unit, the tilt angle calculation unit, and a distortion correcting unit for creating image data for a projected image of which distortion is corrected based on information measured by the distance measuring unit and information calculated by the tilt angle calculation unit.

12. A projector as set forth in claim 2, further comprising:
a light source unit;
a display device;
a light source side optical system for guiding light from the light source unit to the display device;
a projection side optical system for projecting an image projected from the display device onto the screen; and
a projector control unit for controlling the light source unit and the display device;
wherein the projector control unit comprises the distance measuring unit, the tilt angle calculation unit, and a distortion correcting unit for creating image data for a projected image of which distortion is corrected based on information measured by the distance measuring unit and information calculated by the tilt angle calculation unit.

* * * * *